United States Patent [19]

Woods et al.

[11] 4,022,816

[45] May 10, 1977

[54] PURIFICATION OF CHLOROBUTYRONITRILE

[75] Inventors: Edward G. Woods, Seabrook, Tex.; Lawrence H. Shepherd, Jr.; Eric P. Breidenbach, both of Baton Rouge, La.

[73] Assignee: Ethyl Corporation, Richmond, Va.

[22] Filed: May 2, 1975

[21] Appl. No.: 573,940

[52] U.S. Cl. .............................. 260/465.7; 260/464
[51] Int. Cl.$^2$ ...................................... C07C 120/04
[58] Field of Search ................................ 260/465.7

[56] References Cited

UNITED STATES PATENTS

| | | | |
|---|---|---|---|
| 2,415,261 | 2/1947 | Rogers | 260/465.7 X |
| 2,800,497 | 7/1957 | Indest | 260/465.7 |
| 3,725,458 | 4/1973 | Starks | 260/465.3 X |
| 3,839,399 | 10/1974 | Starks et al. | 260/465.1 X |
| 3,941,827 | 3/1976 | Johnson | 260/465.7 |
| 3,974,199 | 8/1976 | Plonka et al. | 260/464 |

OTHER PUBLICATIONS

Starks, J.A.C.S., 93, 1971, pp. 195–199.
Allen, Organic Synthesis, Coll. vol. I, 2nd Ed., 1941, pp. 156–157.
Starks, et al., J.A.C.S., 95, 1973, pp. 3613–3617.
Rappoport, "The Chemistry of the Cyano Group", 1970, pp. 77–79, Interscience Publishers.
B564,252, Mar. 1976, Plonka et al., 260/465.7

*Primary Examiner*—Joseph Paul Brust
*Attorney, Agent, or Firm*—Donald L. Johnson; John F. Sieberth; Shelton B. McAnelly

[57] ABSTRACT

Chloro alkyl nitriles containing from about 3 to about 7 carbon atoms, such as chlorobutyronitrile, are produced in high purity by reacting the corresponding bromochloro alkane, typically 1-bromo-3-chloropropane, with alkali metal cyanide or alkaline earth metal cyanide in an aqueous system in the presence of catalyst of the formula $(R)_4MX$ wherein M is a Group V-A element; one, two or three of the R groups are lower alkyl having from 1 to about 4 carbon atoms, or phenyl; each of the other R groups is alkyl having from 2 to about 20 carbon atoms, or phenyl; X is a compatible anion such as chlorine, iodine, or bromine atom or a hydroxyl group. Such catalysts, especially tributyl methyl ammonium chloride, bromide, or iodide are effective during the reaction and are readily removed from the product after the reaction. Organic phase product from this reaction is purified in a sequence of several steps. Preferably, it is washed with water to remove at least a part of the residual catalyst present therein. Then the washed product is subjected to distillation to remove unreacted bromochloro alkane. After distillation, contaminant bromo alkyl nitrile is converted to chloro alkyl nitrile by a reaction with a water soluble chloride salt in the presence of catalyst of the foregoing type, additional catalyst being added if necessary. Following the last reaction, the aqueous and organic phases are separated removing the bromine as the bromine counterpart of the water soluble chloride salt used in the last reaction and the product is again washed with water to remove at least part of the catalyst used in the purification reaction.

6 Claims, No Drawings

PURIFICATION OF CHLOROBUTYRONITRILE

DESCRIPTION OF THE PRIOR ART

The prior art preparation of chloronitriles by the reaction of a corresponding alkyl chlorobromide with a cyanide source material such as alkali metal cyanide has involved considerable difficulty because of the production of by-product alkyl bromonitrile and the prior difficulty of removal of that by-product. Typically, the amount of contaminant bromobutyronitrile in chlorobutyronitrile produced from 1-bromo-3-chloropropane by the prior art processing is from about 5 to about 20 mol percent of the total reaction product system.

SUMMARY OF THE INVENTION

It has been discovered that the amount of bromonitrile contaminant in chloronitrile produced by reacting a bromochloroalkane with a cyanide source, typically alkali metal cyanide, can be reduced by reacting the mixed halo nitriles with a chloride salt in an aqueous system in the presence of a catalyst which provides tetraalkyl Group V-A ions in an aqueous system. It has been discovered that catalysts which provide the tributyl methyl ammonium ion such as tributyl methyl ammonium iodide, chloride or bromide are effective and are low in cost, and hence are preferred. This class of catalysts provides the desired properties to a high degree especially for the production of chlorobutyronitrile. Preferred water soluble chloride salt used in the process is alkali metal chloride or alkaline earth metal chloride, preferably alkali metal chloride, especially sodium chloride or potassium chloride. For other products, other catalysts or other chloride salts may be more desirable in some instances; however, through the utilization of the principles, considerations and experimental procedures taught by the present disclosure, one is enabled to perform routine experimentation with various reactants, various catalyst candidates and various chloride salts, so as to determine preferred materials for specific situations without the need for further invention.

In one aspect, the present invention is directed to a process for purifying chlorobutyronitrile contaminated with bromobutyronitrile which comprises treating said chlorobutyronitrile with aqueous alkali metal chloride in the presence of a catalyst of the formula $(R)_4MX$ wherein M is a Group V-A element, one, two or three of the R groups is lower alkyl having from 1 to about 4 carbon atoms, or phenyl; each of the other R groups is alkyl having from 2 to about 20 carbon atoms, or phenyl; X is an anion, typically, chlorine, iodine or bromine atom or a hydroxyl group; at a temperature of from about 70 to about 130° C whereby bromobutyronitrile impurity is converted to chlorobutyronitrile forming an aqueous solution of alkali metal bromide; and separating the aqueous phase from the chlorobutyronitrile.

In one aspect, the present invention is directed to a process for producing chlorobutyronitrile which comprises reacting trimethylene chlorobromide with an alkali metal cyanide in an aqueous system in the presence of from about 0.005 to about 10.0 mol percent based on the 1-bromo-3-chloropropane of a catalyst of the formula $(R)_4MX$ wherein M is a Group V-A element, one, two or three of the R groups are alkyl having from 1 to about 4 carbon atoms, or phenyl; each of the other R groups is alkyl having from 2 to about 20 carbon atoms, or phenyl; X is chlorine, iodine or bromine atom or a hydroxyl group, at a temperature of from about 50° to about 125° C whereby chlorobutyronitrile is produced; separating the aqueous phase; washing the organic phase with water to remove at least a portion of the catalyst; distilling off residual 1-chloro-3-bromopropane, treating the distilled product with aqueous alkali metal chloride in the presence of catalyst as set forth above to convert co-present by-product bromobutyronitrile to chlorobutyronitrile; separating the resulting aqueous phase from the chlorobutyronitrile phase; and washing the chlorobutyronitrile with water to remove catalyst therefrom.

DESCRIPTION OF THE PREFERRED EMBODIMENTS

The present invention is directed to a process for purifying chlorobutyronitrile produced by reacting 1-bromo-3-chloropropane with an alkali metal cyanide in an aqueous system in the presence of from about 0.005 to about 10.0 percent of a catalyst of the formula $(R)_4MX$ wherein M is a Group V-A element; one, two or three of the R groups are lower alkyl having from 1 to about 4 carbon atoms, or phenyl; each of the other R groups is alkyl having from 2 to about 20 carbon atoms, or phenyl; and X is a compatible anion such as chlorine, iodine, bromine or hydroxyl, sulfate or similar group. The product thus produced, although usable as such in instances where high purity is not required, is treated for catalyst recovery and for the removal of excess reactants and by-products.

Purification to remove contaminants occurs in a sequence of steps. Although all of the steps, taken together, provide a preferred process, some of them may be omitted where a less pure product is acceptable. Preferably, catalyst from the reaction is first removed by separating the aqueous and organic phases and then washing the organic phase with water. Chlorobutyronitrile is thus obtained which has a reduced quantity of residual catalyst in comparison to that in the untreated reaction product; however, it still contains excess 1-chloro-3-bromopropane reactant which is removed by distillation or stripping.

After the removal of excess 1-chloro-3-bromopropane, the desired product usually is still contaminated with by-product bromobutyronitrile. This is removed by a reaction with a water soluble chloride salt, especially an alkali metal or alkaline earth metal chloride such as sodium chloride, potassium chloride, calcium chloride or magnesium chloride, whereby the bromobutyronitrile contaminant is converted to chlorobutyronitrile. This reaction is preferably performed in the presence of catalyst as defined in the foregoing for the initial reaction.

Preferably, the alkali metal cyanide reacted with 1-chloro-3-bromopropane in the process of the present invention is sodium cyanide or potassium cyanide, especially the former. Preferably, the catalyst is a tetraalkyl ammonium or phosphonium chloride, bromide, or iodide, especially such as ammonium compound. An excellent catalyst is a $(C_3H_7)_4M^+$ catalyst. A preferred catalyst from a cost-effectiveness standpoint is a tributyl methyl ammonium chloride, bromide or iodide. Preferably, the process of the present invention is performed at a temperature of from about 50° to about 125° C, especially from about 60° to about 100° C.

Preferably, the amount of catalyst used in the present process is from about 0.005 to about 10.0 mol percent, especially from about 0.05 to about 0.4 mol percent, based on the 1-chloro-3-bromopropane fed.

DISCUSSION

The present invention is directed to the preparation of chloronitrile compounds such as those useful for producing cyclopropyl cyanide compounds wich have utility for the production of insecticides as described in U.S. Pat. No. 3,739,025. Chloropropyl cyanides are readily cyclicized to corresponding cyclopropyl cyanides as described in said patent. Especially useful cyclopropyl cyanides are those which have no substitution other than the nitrogen or which contain only hydrogen and carbon atom substitution such as compounds which are substituted with one or more alkyl groups having from 1 to about 4 carbon atoms per alkyl group. In general, the substitution present in product cyclopropyl cyanide corresponds to that carried over from the starting 1-bromo-3-chloropropane used to produce the chloronitrile. Usually a starting material is selected so as to provide the product desired. Typical 1-bromo-3-chloropropanes are 1-bromo-3-chloropropane, 1-bromo-2-ethyl-3-chloropropane, 1-bromo-2-methyl-3-chloropropane, 1-bromo-3-propyl-3-chloropropane, and the like. It is recognized therefore that the carbon skeletal structure of suitable 1-bromo-3-chloropropanes can be straight chain or branched chain and that the halogens can be attached to internal carbon atoms of the carbon skeletal chain. Also it is evident that the subisituted propane terminology is just one form that may be used, and that there are other nomenclature systems; for example, a compound termed 2-bromo-4-chlorohexane is also within the scope of the present disclosure. Preferably, the total number of carbon atoms is starting 1-bromo-3-chloropropanes is from 3 to about 12. Preferably 1-bromo-3-chloropropane is used to produce chlorobutyronitrile and chlorobutyronitrile is used to produce a preferred product, cyclopropyl cyanide ($\triangleright$—CN).

The cation of the metal cyanide reacted in the process of the present invention preferably is that of an alkali metal or alkaline earth metal; however, alkali metal cyanides are preferred, especially potassium cyanide and sodium cyanide, the latter usually being preferred because of low cost, excellent reactivity and ready availability.

Catalysts useful in the process of the present invention are in general any compound which provides in the reaction system the ion $(R)_4M^+$ where M is a Group V-A element of Periodic Chart of the Elements, Fisher Scientific Company, Chicago, Illinois, 1955, (nitrogen, phosphorus, arsenic antimony, or bismuth); one, two, or three of the R groups are lower alkyl having from 1 to about 4 carbon atoms, or phenyl; each of the other R groups is alkyl having from 2 to about 20 carbon atoms or phenyl; and wherein X is a chlorine, iodine, or bromine atom or a hydroxy or sulfate group. Preferred $(R)_4MX$ compounds are those wherein the total number of carbon atoms in the $(R)_4$ portion are from about 10 to about 30, preferably from about 12 to about 20, or from about 12 to about 16, especially those wherein the R groups are acyclic groups. Preferred compounds are the ammonium or phosphonium compounds. Suitable phenyl groups are unsubstituted or substituted with compatible substituency which does not react adversely in the systems. Preferably the substitution on phenyl groups is limited to that containing only hydrogen and carbon atoms such as lower alkyl groups having from 1 to about 4 carbon atoms, such as methyl, ethyl, propyl or butyl groups. Typical catalyst compounds include tributyl methyl ammonium chloride (13 carbon atoms in the $(R)_4$ portion), tributyl methyl phosphonium chloride, tributyl methyl ammonium iodide, tributyl methyl phosphonium bromide, tributyl methyl ammonium hydroxide, tributyl ethyl ammonium iodide (14 carbon atoms in the $(R)_4$ portion), tributyl ethyl ammonium bromide, tributyl ethyl ammonium chloride, tributyl methyl arsenic chloride, tributyl methyl antimony chloride, tributyl methyl bismuth chloride, dodecyltrimethyl ammonium chloride, didecyldimethyl ammonium chloride, tetraphenyl ammonium chloride, and the like. Other suitable catalysts are tripropyl butyl ammonium chloride, tripropyl butyl ammonium bromide, tripropyl butyl ammonium iodide, and the like. Other suitable catalysts are tripropyl pentyl ammonium chloride, tripropyl pentyl ammonium bromide, tripropyl pentyl ammonium iodide, and the like. Other suitable catalysts are tripropyl hexyl ammonium chloride, tripropyl hexyl ammonium bromide, tripropyl phenyl ammonium chloride, dipropyl methyl ethyl cloride, dimethyl ethyl phenyl chloride, tripropyl phenyl ammonium iodide, tributyltetradecyl phosphonium bromide ($Bu_3C_{14}H_{29}$ PBr), and the like.

The amount of catalyst used is in general an effective amount to achieve at least some catalytic effect; however, in general, one does not use more catalyst than is necessary to achieve a reasonable reaction rate since such usually involves the monopolization of reactor volume, needless expense, and the like. In general, the amount of catalyst used ranges from about 0.005 to about 10 mol percent based on the 1-bromo-3-chloropropane reactant with from about 0.01 to about 2.0 percent, especially from about 0.05 to about 0.4 percent, being preferred. Preferred catalysts contain a total of from about 12 to about 16 carbon atoms total in the R groups, especially those in which all R groups are not the same, since several such catalysts have an excellent relationship between the solubilities thereof in the reaction system as well as in water wash systems useful to remove catalyst residue from the product. Other criteria considered in the selection of catalysts include initial cost and ease of preparation. Outstanding catalysts are tributyl methyl ammonium halides such as the chloride since they are readily prepared by a comparatively easy reaction of two readily available low cost materials, e.g., tributyl amine and methyl chloride in excess, at 100° C in acetone for two hours, such reaction proceeding without significant difficulty.

Physical conditions used for the reaction of the present invention are not critical, although such factors as temperature and proportions affect reaction rates in a more or less straightforward manner. Preferred temperatures range from about 50° to about 125° C, preferably from about 60° to about 100° C, especially from about 75° to about 95° C. A typical reaction temperature is 85° C. Since the present reaction proceeds readily at ordinary atmospheric pressure, there is no particular need to use pressures significantly different therefrom except for extrinsic factors such as the desire to minimize problems due to leakage and the like. Thus, for example, to avoid any possibility of escape of cyanide-containing materials from the reactor system, operation at reduced pressure, for example, three quarters of an atmosphere, may be advantageous. In general, therefore, suitable reaction pressures range from about 0.1 to about 10 atmospheres with pressures around 1 atmosphere, for example, 0.9 to about 1.1 atmospheres usually being preferred.

The proportioning of the reactants is not especially critical to the reaction itself; however, in general, it is preferred to provide an excess of the 1-bromo-3-chloropropane reactant to provide substantially complete and rapid reaction of the cyanide reactant to minimize the amount of cyanide material remaining in the aqueous phase after the reaction. Additionally, an excess of 1-bromo-3-chloropropane is desirable also to minimize the production of glutaronitrile, the presence of which in product chlorobutyronitrile is frequently undesired. In general, therefore, the proportions of the reactants range from about 10 mols of 1-bromo-3-chloropropane per equivalent of metal cyanide to about 1 mol of 1-bromo-3-chloropropane per equivalent of metal cyanide. Preferred reactant proportions range from about 1.25 mols of 1-bromo-3-chloropropane per equivalent of metal cyanide to about 2 mols of 1-bromo-3-chloropropane per equivalent of metal cyanide. In general, it is preferred to use about 1.5 mols of 1-bromo-3-chloropropane per equivalent of metal cyanide since it has been found that this ratio provides an excellent balance in regard to extent of completion of the reaction of the metal cyanide and minimizing by-products, on the one hand, and the expense of recovery and recycle of the excess or unreacted 1-bromo-3-chloropropane, on the other.

It will be apparent from the foregoing that an important aspect of the present invention is the use of a catalyst whose solubility can be controlled so that in a two-phase environment of an organic phase and an aqueous phase containing a metal salt, the catalyst is soluble to a significant extent in the organic phase whereas in a system wherein the aqueous phase contains little or no metal salt, the catalyst is preferentially soluble in the aqueous phase. The preferred catalysts have such properties, whereby the catalyst is in the organic phase for the reaction while it is washed out of the organic phase after the reaction by a comparatively simple procedure. Catalyst removal is typically brought about by separating the organic and aqueous phases of the reaction system, thereby removing the water soluble salt of the reaction system and then washing the remaining organic phase by adding more or less pure water or a less concentrated metal salt solution which selectively removes catalyst from the organic phase. Upon subsequent separation of the organic phase from the aqueous washing phase, recovery of a substantial portion of the catalyst is possible.

With the catalyst thus removed from the organic phase, it is possible to separate the excess 1-bromo-3-chloropropane reactant from the chloronitrile product by one of several simple procedures such as distillation. The catalyst is preferably separated prior to the distillation operation to remove the residual reactant 1-bromo-3-chloropropane to avoid undesired side reactions such as:

ClCH$_2$CH$_2$CH$_2$CN + ClCH$_2$CH$_2$CH$_2$Br →

BrCH$_2$CH$_2$CH$_2$CN + ClCH$_2$CH$_2$CH$_2$Cl

This combination of manipulative steps will in general provide a product which contains only about ⅔ as much bromonitrile compound contaminant as does the crude reaction product if the removal of excess reactant is performed without the prior or intervening separation of catalyst.

Although the product obtained from the preceding portions of the process are useful and desirable in many instances, there are instances wherein it is desirable to have a lower percentage contamination of the product chlorobutyronitrile with by-product bromobutyronitrile. In such instances the following purification process is advantageously employed. The purification process is a useful process in itself since it is useful to purify chlorobutyronitrile produced by other processes. On the other hand, purification operations described herein preferably are used in conjunction with the specific process for producing chlorobutyronitrile by reacting 1-chloro-3-bromopropane and alkali metal cyanide or alkaline earth metal cyanide in the presence of catalyst as defined herein. Such combined processing therefore provides a preferred process for producing chlorobutyronitrile.

In the purification operation, the chlorobutyronitrile contaminated with bromobutyronitrile is treated with aqueous alkali metal chloride in the presence of a catalyst of the formula (R)$_4$MX, as set forth in the preceding for the reaction of 1-bromo-3-chloropropane with metal cyanide in an aqueous system. As a result, an exchange reaction occurs wherein chlorine of the alkali metal chloride is exchanged with the bromine of the bromobutyronitrile contaminant, thereby converting the bromobutyronitrile into additional chlorobutyronitrile and forming alkali metal bromide. Since the chlorobutyronitrile is essentially in the organic phase and the alkali metal bromide is essentially in the aqueous phase, a phase separation operation removes the bromide salt leaving a chlorobutyronitrile system with a reduced amount of bromine containing contaminant. The foregoing contacting with alkali metal chloride is suitably performed in one or more steps depending upon the degree of conversion and complexity desired.

The organic phase that results from the preceding operations contains residual catalyst which preferably is removed by an extraction or washing with water or dilute alkali metal or alkaline earth metal chloride salt solution. The selective solubility of preferred catalyst in the salt-free water phase is utilized to advantage to effect this catalyst removal or reduction to provide a product chlorobutyronitrile of high purity.

Various chloride salts are useful in the treatment of the impure chlorobutyronitrile to convert the bromobutyronitrile into chlorobutyronitrile. Preferred chloride salts used in the treatment steps are those whose bromide counterparts as well as the chlorides themselves are water soluble. Alkali metal and alkaline earth metal salts are preferred because of their low cost and the ease with which the bromide salts are subsequently treated for recovery of the bromine values. Preferred salts are sodium chloride and potassium chloride, especially the former. Other useful salts include lithium chloride, calcium chloride, and magnesium chloride.

The conditions of the purification steps are not critical. Although solubilities are affected by temperature, it is usually preferred to minimize costs attendant to bringing about significant changes in the temperature of supply and discharge streams. Thus temperatures from about 50° to about 200° C are useful with temperatures from about 75° to about 125° C preferred, especially from about 90° to about 110° C.

The amount and concentration of the aqueous salt system used in the treating step is not critical. In general, one uses several times the amount required to react with all of the bromine contaminant so as to force the catalyst into the chlorobutyronitrile phase; however, some bromine exchange is obtained with lesser amounts, even when feeding solutions containing 10 parts per million or less of the treating salt.

The amount and identity of catalyst used in the treatment step is governed by considerations which parallel those of the initial reaction step wherein 1-bromo-3-chloropropane is reacted with the metal cyanide to form the chlorobutyronitrile.

The amount of water or dilute salt solution used in the washing step of the treatment process is not critical and may range from about 0.1 to about 1000 percent by volume based on the chlorobutyronitrile. In general, one uses only as much water or dilute salt solution as is necessary to achieve the desired purity of product chlorobutyronitrile and does not use more than such amount to minimize volumes that must be handled and losses of chlorobutyronitrile.

The following examples indicate preferred embodiments and aspects of the present invention.

EXAMPLE I

To 140 grams of 95 percent 1-bromo-3-chloropropane, (133 grams active, 0.845 mols) in a 1-liter creased flask immersed in a water bath was added 28.2 g NaCN (0.576 mols), 1.5 g of 50 percent NaOH aqueous solution, (to insure that no HCN escapes) and 85.0 ml $H_2O$. While stirring, the reactants were heated to 77.5° C. Then 0.84 ml of 52 wt. percent solution of $Bu_3NMeCl$ (0.43 g active, 1.85 mmols, 0.21 mol percent based on total organic feed) was added. The reactor temperature rose to 82.0° C in the first minute and after the addition of the catalyst, and to 85.5° in the second minute, peaking at 88° after 3 minutes. The temperature of the bath was increased slowly to 83°–85° in order to keep the reactor temperature from falling below 85° C. Samples of the reactor contents were taken at 30-minute intervals and analyzed. The organic phase was analyzed by VPC for TMCB (1-bromo-3-chloropropane), CBN (chlorobutyronitrile), BBN (bromobutyronitrile), DCP (1,3-dichloropropane), DBP (dibromopropane) and GTN (glutaronitrile).

The aqueous phase was analyzed for residual NaCN. The extent of reaction correlated with percent cyanide remaining. A semi-log plot of cyanide (unreacted) vs. time was linear after the temperature became stable at 85° C. In this reaction a pseudo-first order rate constant of 1.05 $hr^{-1}$ was obtained.

Typical cyanide conversions of 90+ percent are usually realized in 2.5 hours.

Results are tabulated in Table I.

EXAMPLES II-XIV

Example I was repeated in a series of runs using various catalysts and a 1.5 molar feed ratio of TMCB/NaCN. Comparative results for these examples as well as Example I are set forth in Table II.

EXAMPLE XV 25 grams (225 millimols) of impure CBN was placed in a 250 ml creased flask fitted with a reflux condenser and fast magnetic stirrer. The CBN had the following analysis of principal components normalized to 100 percent.

|  | Weight Percent |
|---|---|
| CBN | 64.4 |
| BBN | 29.8 |
| GTN | 5.8 |
|  | 100.0 |

In addition, the CBN contained 0.52 mol equivalent (0.23 mol percent) of $Bu_4N^+$ ions. The CBN was obtained by reacting 1-bromo-3-chloropropane with sodium cyanide using a procedure similar to that of Example II feeding tetrabutyl ammonium bromide as catalyst, wherein the aqueous phase resulting from the reaction was separated from the organic phase, the organic phase washed with water to remove a part of the catalyst, and residual 1-chloro-3-bromopropane was distilled off.

Aqueous NaCl (25.0 grams NaCl, 426 millimols, in 60 grams $H_2O$) was added to the flask along with 1.0 gram of ethyl benzene (VPC internal standard). The reaction mass was stirred and held at 90° C for 3 hours by means of a constant temperature bath. Samples were withdrawn periodically for analysis by V.P.C.

The results are set forth in Table III.

The reaction:

$$BBN + Cl^- \rightleftharpoons CBN + Br^-$$

reached equilibrium in 3 hours, during which time the BBN content decreased from 29.8 to 9.0 wt. percent and the CBN increased from 64.4 to 85.2 wt. percent.

It was shown that essentially none of the nitrile or halide groups were undergoing hydrolysis or other side reactions by the fact that the material balance on the nine samples is 228.0 ± 12.4 mmol total organic.

The data show that the BBN → CBN conversion proceeded readily and can be correlated linearly in a pseudo-first order manner by plotting $$\ln\left(\frac{BBN - BBN\ equil.}{BBN_o - BBN\ equil.}\right) \text{vs. time.}$$

The rate constant ($k$) in this case, was found to be 1.74 $hr^{-1}$ and the fit of this data has a correlation coefficient >0.99.

Even lower BBN values can be obtained by performing the exchange several times with fresh brine, the catalyst tending to remain in the organic phase. The exchange reaction time is readily decreased by employing (a) highter temperature, (b) more catalyst, (c) more frequent brine changes.

TABLE I

| Reaction Time (Hours) | Mol Percent | | | | | | $CN^-$ Percent Remaining |
|---|---|---|---|---|---|---|---|
|  | TMCB | CBN | BBN | DCP | DBP | GTN |  |
| 0.50 | 56.61 | 39.84 | 1.28 | 0.73 | 0.48 | 1.06 | 30.8 |
| 1.00 | 48.31 | 46.55 | 1.94 | 0.73 | 0.68 | 1.79 | 17.5 |
| 1.50 | 44.29 | 49.06 | 2.65 | 0.69 | 0.84 | 2.48 | 10.6 |
| 2.00 | 41.20 | 50.03 | 3.56 | 1.11 | 1.10 | 2.99 | 6.3 |
| 2.50 | 39.10 | 48.61 | 4.38 | 2.21 | 2.52 | 3.18 | 3.7 |
| 3.0 | 40.61 | 48.41 | 4.77 | 1.06 | 1.60 | 3.55 | — |

TABLE II

First-Order Rate Constants for Several Catalysts

| Example No. | Catalyst | g Catalyst | g BrClPr (95 Percent Purity) | Mol Percent Catalyst | Temp. (°C) | $k_2$, $hr^{-1}$ |
|---|---|---|---|---|---|---|
| 1  | (Bu)₃NMeCl     | 0.436 | 140.0 | 0.208 | 85.0 | 1.052 |
| 2  | (Bu)₄NBr       | 0.50  | 136.0 | 0.180 | 85.0 | 1.026 |
| 3  | (Bu)₄NBr       | 0.50  | 136.0 | 0.180 | 84.5 | 1.161 |
| 4  | (Bu)₃NMeI      | 0.302 | 68.0  | 0.214 | 85.0 | 1.065 |
| 5  | (Bu)₃NMeCl     | 0.218 | 140.0 | 0.103 | 84.7 | 0.792 |
| 6  | (Bu)₃NMeCl     | 0.437 | 68.0  | 0.430 | 84.0 | 1.52  |
| 7  | (Bu)₃NMeCl     | 0.436 | 140.0 | 0.208 | 74.5 | 0.517 |
| 8  | (Pr)₃NMeI      | 1.402 | 68.0  | 1.14  | 84.5 | 1.634 |
| 9  | (Pr)₄NBr       | 0.375 | 67.0  | 0.326 | 84.5 | 1.537 |
| 10 | (Pr)₄NBr       | 1.30  | 204.0 | 0.377 | 84.5 | 1.817 |
| 11 | (C₁₂)₂NMe₂Br   | 0.770 | 68.0  | 0.386 | 84.5 | 1.73  |
| 12 | (C₁₀)₂NMe₂Cl   | 0.28  | 68.0  | 0.178 | 85.0 | 0.904 |
| 13 | (C₁₂)NMe₃Cl    | 0.229 | 68.0  | 0.201 | 84.5 | 1.000 |
| 14 | (C₁₄)PBu₃Br    | 0.421 | 68.0  | 0.203 | 85.0 | 1.23  |

$Bu = C_4H_9-$, $Me = CH_3-$, $Pr = C_3H_7-$, $C_{12} = C_{12}H_{25}-$, $C_{10} = C_{10}H_{21}-$, $C_{14} = C_{14}H_{29}-$

TABLE III

Reconversion of BBN to CBN by NaCl Exchange Reaction, 90° C

| Time (Hr) | Normalized % CBN Mol | Normalized % CBN Wt | Normalized % BBN Mol | Normalized % BBN Wt | Normalized % GTN Mol | Normalized % GTN Wt | $\left(\frac{BBN - BBN_e}{BBN_o - BBN_e}\right)$ Found[1] | $\left(\frac{BBN - BBN_e}{BBN_o - BBN_e}\right)$ Calculated[2] |
|---|---|---|---|---|---|---|---|---|
| 0.0  | 70.07 | 64.4 | 22.87 | 29.80 | 7.06 | 5.82 | 1.000 | 0.915 |
| 0.25 | 77.82 | 74.4 | 15.69 | 21.2  | 6.49 | 5.50 | 0.562 | 0.591 |
| 0.50 | 79.88 | 76.3 | 12.61 | 17.2  | 7.50 | 6.50 | 0.374 | 0.382 |
| 0.75 | 83.37 | 80.3 | 10.40 | 14.2  | 6.23 | 5.44 | 0.239 | 0.247 |
| 1.00 | 84.83 | 82.2 | 8.91  | 12.3  | 6.26 | 5.50 | 0.148 | 0.160 |
| 1.50 | 85.70 | 83.5 | 7.75  | 10.8  | 6.56 | 5.80 | 0.077 | 0.067 |
| 2.00 | 86.39 | 84.5 | 6.93  | 9.6   | 6.68 | 5.92 | 0.027 | 0.028 |
| 2.50 | 86.86 | 85.0 | 6.57  | 9.2   | 6.57 | 5.82 |       |       |
| 3.00 | 87.02 | 85.2 | 6.49  | 9.0   | 6.49 | 5.75 | (equivalent) | |

[1]Coefficient of determination for semi-log plot is 0.996 or calculated from least-squares data.

[2]Calculated from: $\ln\left(\frac{BBN - BBN_e}{BBN_o - BBN_e}\right) = -1.744(t) - 0.0893$.

We claim:
1. A process for producing chlorobutyronitrile which comprises:
   1. reacting 1-chloro-3-bromopropane with an alkali metal cyanide in an aqueous system in the presence of from about 0.005 to about 10.0 mol percent of a catalyst of the formula $(R)_4MX$ wherein M is a Group V-A element; one, two or three of the R groups are lower alkyl having from 1 to about 4 carbon atoms or phenyl; each of the other R groups is alkyl having from 2 to about 20 carbon atoms or phenyl; X is chlorine, iodine, bromine, or a hydroxyl group, at a temperature of from about 50 to about 200° C whereby a mixed aqueous-organic system containing chlorobutyronitrile contaminated with bromobutyronitrile, $(R)_4MX$ and residual 1-chloro-3-bromopropane is produced;
   2. separating the product from 1 into aqueous and organic phases providing an organic phase system containing chlorobutyronitrile, by-product bromobutyronitrile, $(R)_4MX$ and unreacted 1-chloro-3-bromopropane;
   3. washing the organic phase system obtained at step 2 with water to remove at least a portion of the $(R)_4MX$ contained therein,
   4. distilling off residual 1-chloro-3-bromopropane from the washed organic phase system obtained at step 3 providing a distillation product containing chlorobutyronitrile contaminated with by-product bromobutyronitrile,
   5. treating the distilled product from 4 with aqueous alkali metal chloride in the presence of $(R)_4MX$ to convert by-product bromobutyronitrile to chlorobutyronitrile,
   6. separating the mixture from 5 into aqueous and organic phases provided an organic phase system containing purified chlorobutyronitrile and $(R)_4MX$, and
   7. water washing the chlorobutyronitrile containing organic phase from 6 to remove $(R)_4MX$ therefrom.

2. In a process for purifying chlorobutyronitrile contaminated with bromobutyronitrile, 1-chloro-3-bromopropane and from about 0.005 to about 10.0 mol percent of a catalyst which provides the $(R)_4M^+$ ion wherein M is a Group V-A element; one, two or three of the R groups are lower alkyl having from 1 to about 4 carbon atoms or phenyl; each of the other R groups is alkyl having from 2 to about 20 carbon atoms or phenyl, the improvement which comprises:
   1. washing the contaminated chlorobutyronitrile with water to remove at least a portion of the catalyst providing a mixed phase aqueous organic product,
   2. separating the product from 1 into aqueous phase and organic phase systems,
   3. distilling the organic phase system produced at step 2 to remove residual 1-chloro-3-bromopropane, and
   4. contacting the distilled chlorobutyronitrile from 3 with aqueous alkali metal chloride to convert co-present by-product bromobutyronitrile to chlorobutyronitrile.

3. A process according to claim 2 wherein the contacting step 4 is followed by:
5. separating the product from step 4 into aqueous phase and organic phase systems, the organic phase containing chlorobutyronitrile and catalyst,
6. washing the chlorobutyronitrile containing phase from 5 with water to remove catalyst, and
7. separating aqueous and chlorobutyronitrile phases resulting at step 6.

4. The process of claim 2 wherein the alkali metal chloride is sodium chloride.
5. The process of claim 2 wherein the catalyst is tributyl methyl ammonium chloride, bromide or iodide.
6. A process according to claim 2 wherein the contacting with alkali metal chloride step is performed in the presence of additional catalyst added after the distillation.

* * * * *

UNITED STATES PATENT OFFICE
CERTIFICATE OF CORRECTION

PATENT NO. : 4,022,816
DATED : May 10, 1977
INVENTOR(S) : Edward G. Woods, Lawrence H. Shepherd, Jr.
Eric P. Breidenbach It is certified that error appears in the above-identified patent and that said Letters Patent are hereby corrected as shown below:

Column 2, line 5, reads "wereby", should read -- whereby --; line 63, reads "$(C_3H_7)_4M^+$", should read -- $(C_3H_7)_4M^\oplus$ --.
Column 3, line 8, reads "wich", should read -- which --; line 37, reads "is", should read -- in --; line 51, reads "$(R)_4M^+$", should read -- "$(R)_4M^\oplus$" --; line 54, reads "arsenic antimony", should read -- arsenic, antimony --.
Column 4, line 25, reads "cloride", should read -- chloride --.
Column 8, line 13, reads "$Bu_4N^+$", should read -- $Bu_4N^\oplus$ --; line 31, reads "$BBN + Cl^- \rightleftarrows CBN + Br^-$", should read -- $BBN + Cl^\ominus \rightleftarrows CBN + Br^\ominus$ --; line 56, reads "highter", should read -- higher --; line 60, reads "$CN^-$", should read -- $CN^\ominus$ --. Column 10, line 51, reads "$(R)_4M^+$", should read -- $(R)_4M^\oplus$ --.

Signed and Sealed this

Sixth Day of September 1977

[SEAL]

Attest:

RUTH C. MASON
Attesting Officer

LUTRELLE F. PARKER
Acting Commissioner of Patents and Trademarks